(12) United States Patent
Ye

(10) Patent No.: US 8,317,463 B2
(45) Date of Patent: Nov. 27, 2012

(54) FAN APPARATUS

(75) Inventor: Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 521 days.

(21) Appl. No.: 12/581,159

(22) Filed: Oct. 18, 2009

(65) Prior Publication Data

US 2011/0070070 A1    Mar. 24, 2011

(30) Foreign Application Priority Data

Sep. 18, 2009   (CN) .......................... 2009 1 0307322

(51) Int. Cl.
*F04D 29/42*   (2006.01)
*F04D 29/62*   (2006.01)

(52) U.S. Cl. ...................... 415/126; 415/127; 415/213.1

(58) Field of Classification Search .................. 415/126, 415/127, 128, 213.1, 214.1; 361/695, 679.48; 248/425, 183.2
See application file for complete search history.

(56) References Cited

U.S. PATENT DOCUMENTS

| | | | |
|---|---|---|---|
| 7,059,826 B2 * | 6/2006 | Lasko | 415/127 |
| 7,189,053 B2 * | 3/2007 | Winkler et al. | 415/108 |
| 7,492,592 B2 * | 2/2009 | Ye et al. | 361/695 |
| 2006/0120040 A1 * | 6/2006 | Chen | 361/695 |
| 2008/0172955 A1 * | 7/2008 | McClintock et al. | 52/173.3 |
| 2009/0154092 A1 * | 6/2009 | Chen | 361/679.51 |

* cited by examiner

*Primary Examiner* — Ninh H Nguyen
*Assistant Examiner* — Liam McDowell
(74) *Attorney, Agent, or Firm* — Altis Law Group, Inc.

(57) ABSTRACT

A fan apparatus includes a blower defining an air outlet at a lateral side thereof, an annular guiding rail and a fastener connecting the blower with the guiding rail. The guiding rail defines an annular groove therein. One end of the fastener is received and slidable in the groove of the guiding rail, whereby the fastener can slide in the groove along a circumferential direction of the guiding rail. The other end of the fastener is connected with the blower, and thus the blower is rotatable with respect to the guiding rail such that an orientation of the air outlet of the blower can be easily regulated.

9 Claims, 6 Drawing Sheets

FAN APPARATUS

BACKGROUND

1. Technical Field

The present disclosure relates to a fan apparatus and, more particularly, to a fan apparatus incorporating a centrifugal blower.

2. Description of Related Art

With continuing development of the electronic technology, electronic components, such as central processing units (CPUs), installed in a computer enclosure are becoming more and more functionally powerful, however, in the meantime, they generating more and more heat which requires immediate dissipation.

Conventionally, a centrifugal blower is mounted to the enclosure to produce an airflow which can remove heat from the electronic components. The centrifugal blower comprises a fan casing and an impeller received therein. The fan casing defines an air outlet at a lateral side thereof and the air outlet is oriented towards the electronic components, so that the airflow driven by the impeller is guided to outside of the fan casing via the air outlet. The direction of the airflow depends on a location of the air outlet. As the centrifugal blower is fixedly mounted on the enclosure by a plurality of screws, and a location of the air outlet of the centrifugal blower is unchangeable, orientation of the airflow cannot be easily regulated according to requirement.

On the other hand, computer systems often need to achieve a variety of tasks by changing a printed circuit board (PCB) on which the electronic components are mounted, wherein the positions of the electronic components of the new PCB may be different from previous ones with respect to the computer enclosure and the air outlet of the centrifugal blower. As a result, the airflow driven out from the air outlet may fail to flow to the electronic components.

Therefore, an improved fan apparatus is desired to overcome the above described shortcoming

DETAILED DESCRIPTION

Figure 1:
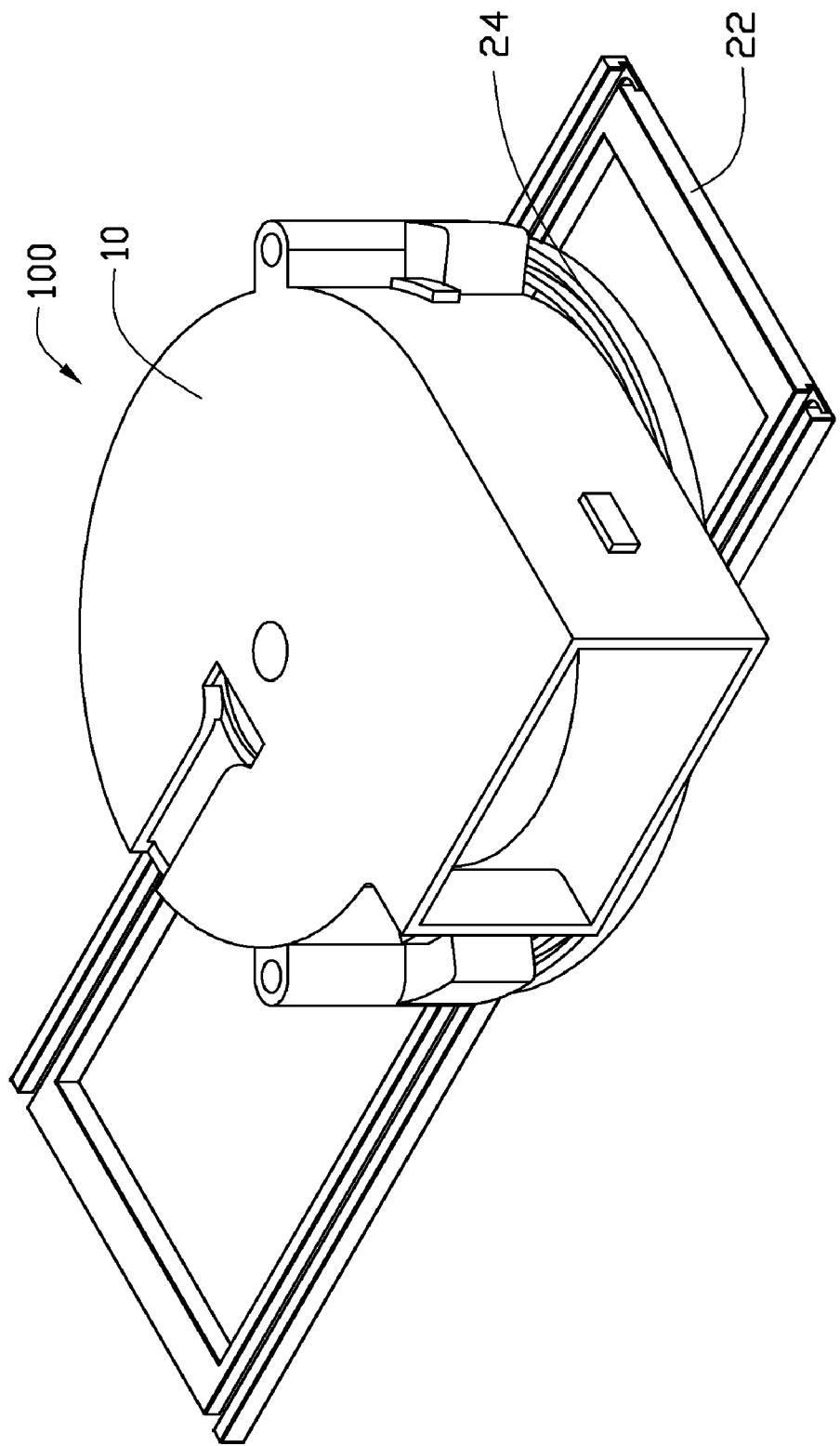
FIG. 1 is an assembled, isometric view of a fan apparatus according to a first embodiment.
Figure 2:
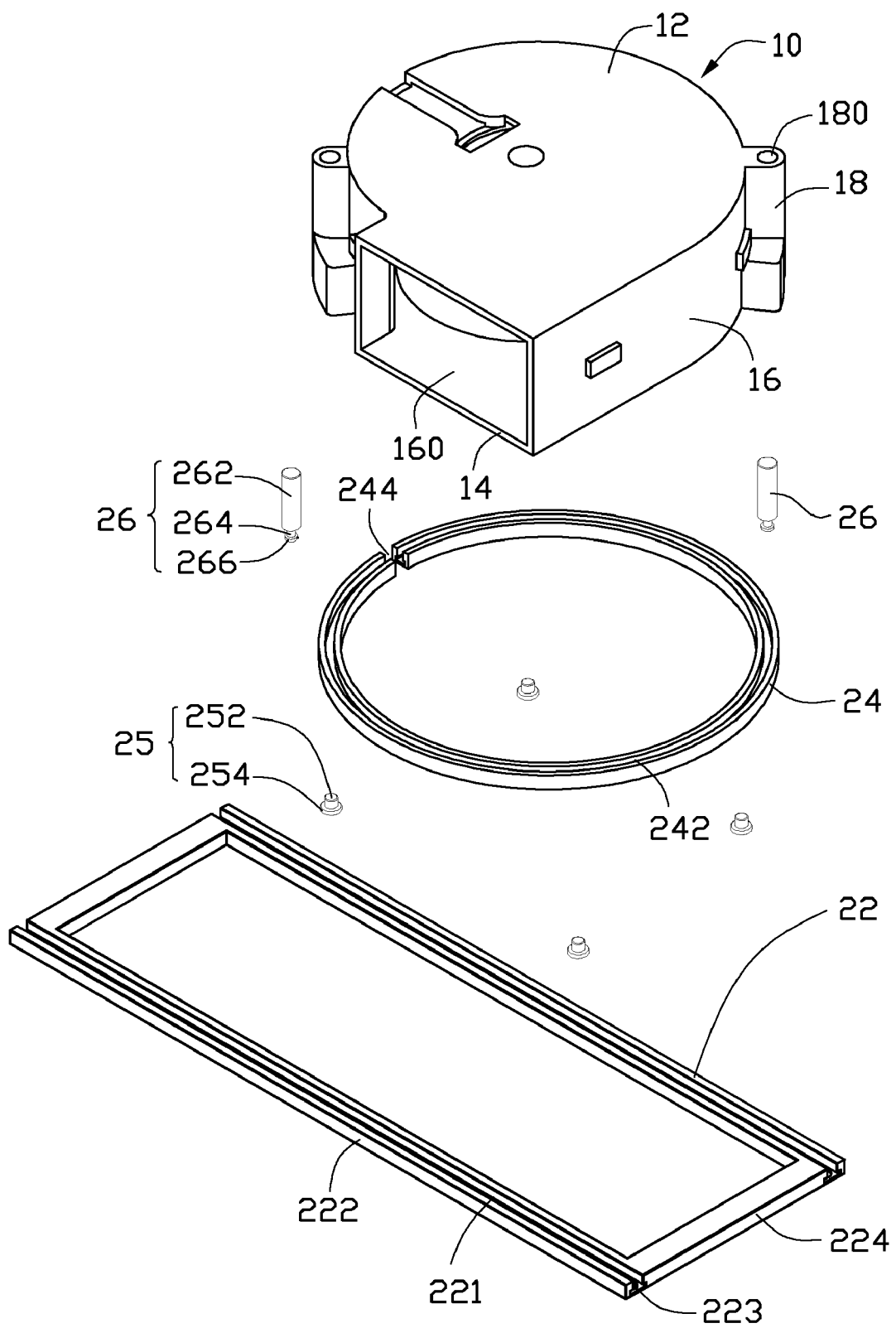
FIG. 2 is an exploded, isometric view of the fan apparatus of FIG. 1.

Referring to FIGS. 1 and 2, a fan apparatus 100 according to a first embodiment is shown. The fan apparatus 100 is installed in an enclosure of an electronic device (not shown) such as a desktop or a server with electronic components mounted therein. The fan apparatus 100 includes a mounting frame 22, an annular guiding rail 24 mounted on the mounting frame 22, a centrifugal blower 10 mounted on the guiding rail 24, and a pair of fasteners 26 for connecting the centrifugal blower 10 to the guiding rail 24.

The centrifugal blower 10 includes a top plate 12, a bottom plate 14, and a curved sidewall 16 surrounding and interconnecting the top plate 12 and the bottom plate 14. The top plate 12, the bottom plate 14 and the sidewall 16 cooperatively define a receiving space therein. An impeller (not shown) is received in the receiving space for producing a forced airflow. An air outlet 160 is defined at the sidewall 16, i.e. at a lateral side of the centrifugal blower 10. A pair of securing ears 18 are formed at an outer periphery of the sidewall 16 and located at two opposite sides of the sidewall 16. The securing ears 18 each extend from the top plate 12 towards the bottom plate 14 along an axial direction of the centrifugal blower 10. The securing ears 18 each define a securing hole 180 therein along the axial direction of the centrifugal blower 10.

The mounting frame 22 is hollow and rectangular. The frame 22 includes a pair of parallel first ribs 222 and a pair of parallel second ribs 224 connected to the two first ribs 222. The second ribs 224 each are shorter than each of the first ribs 222. The first ribs 222 each define an elongated groove 221 therein. Each of the elongated grooves 221 extends from one end of the first rib 222 to the other end of the first rib 222. Each of the elongated grooves 221 is open at two ends of the first rib 222 and forms an entrance 223 at each of the two ends of the first rib 222. The elongated grooves 221 each have an inverted T-shaped cross section, i.e. the elongated groove 221 has a lower portion wider than an upper portion thereof. The mounting frame 22 can be mounted to the enclosure of the electronic device via screws.

The guiding rail 24 is connected with the mounting frame 22. The guiding rail 24 has an annular profile with two ends thereof unconnected. An annular groove 242 is defined in the guiding rail 24 along a circumferential direction of the guiding rail 24. The annular groove 242 is inverted T-shaped in cross section, including a wide bottom portion and a narrow top portion. An entrance 244 is defined at the two ends of the guiding rail 24 and communicates with the annular groove 242.

Figure 3:
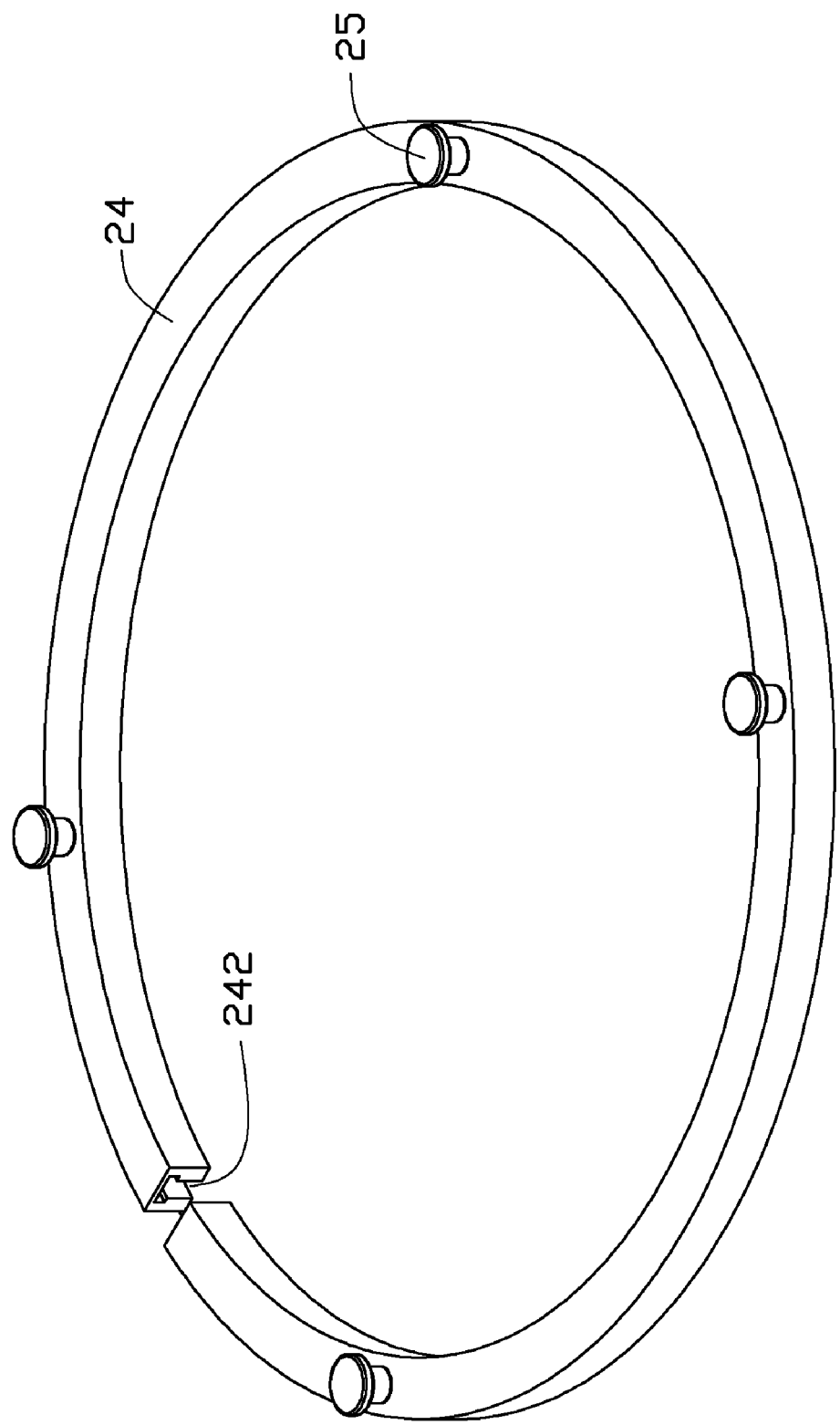
FIG. 3 is an isometric view of a guiding rail of the fan apparatus of FIG. 2, but viewed from another aspect.

Referring also to FIG. 3, four fixing members 25 are connected to a bottom side of the guiding rail 24. Alternatively, the fixing members 25 can be integrally formed with the guiding rail 24. Each of the fixing members 25 includes a main portion 252 with a top end connected to the guiding rail 24 and a head portion 254 connected to a bottom end of the main portion 252. The head portion 254 has a diameter greater than the main portion 252. A width of the upper portion of the elongated groove 221 of the mounting frame 22 is slightly larger than the diameter of the main portion 252 of the fixing member 25, but smaller than the diameter of the head portion 254 of the fixing member 25. A width of the lower portion of the elongated groove 221 of the mounting frame 22 is slightly larger than the diameter of the head portion 254 of the fixing member 25.

The fasteners 26 have the same structure. Each of the fasteners 26 includes a cylindrical main section 262, a fixing section 266 at a bottom of the fastener 26, and a thin section 264 located between the main section 262 and the fixing section 266. The thin section 264 has a diameter smaller than that of the fixing section 266, and the diameter of the fixing section 266 is smaller than that of the main section 262. A width of the top portion of the annular groove 242 of the guiding rail 24 is slightly larger than the diameter of the thin section 264 of the fastener 26, but smaller than the diameter of the fixing section 266 of the fastener 26. A width of the bottom portion of the annular groove 242 of the guiding rail 24 is slightly larger than the diameter of the fixing section 266 of the fastener 26.

In assembly, the fixing members 25 of the guiding rail 24 are brought to engage in the elongated grooves 221 of the mounting frame 22 from the entrances 223 of the first ribs 222, with the head portions 254 of the fixing members 25 received in the lower portion of the elongated groove 221 and the main portions 252 of the fixing members 25 received in the upper portion of the elongated groove 221. Therefore, the fixing members 25 can slide in the elongated groove 221 along an extension direction of the first ribs 222 of the mounting frame 22; thus the guiding rail 24 can slide on the mounting frame 22 linearly when the fixing members 25 slide in the elongated grooves 221. The fasteners 26 are brought to engage into the annular groove 242 of the guiding rail 24 via the entrance 244. The fixing section 266 and the thin section 264 of each of the fasteners 26 are respectively received in the bottom portion and the top portion of the annular groove 242 of the guiding rail 24. As a result, an upward movement of the fastener 26 is restricted because the width of the top portion of the annular groove 242 is smaller than the diameter of the fixing section 266 of the fastener 26, and the fasteners 26 can slide in the annular groove 242 along a circumferential direction of the guiding rail 24. The main sections 262 of the fasteners 26 align with and are mounted in the securing holes 180 of the securing ears 18 of the centrifugal blower 10, respectively, to thereby connect the centrifugal blower 10 to the guiding rail 24.

Figure 4:
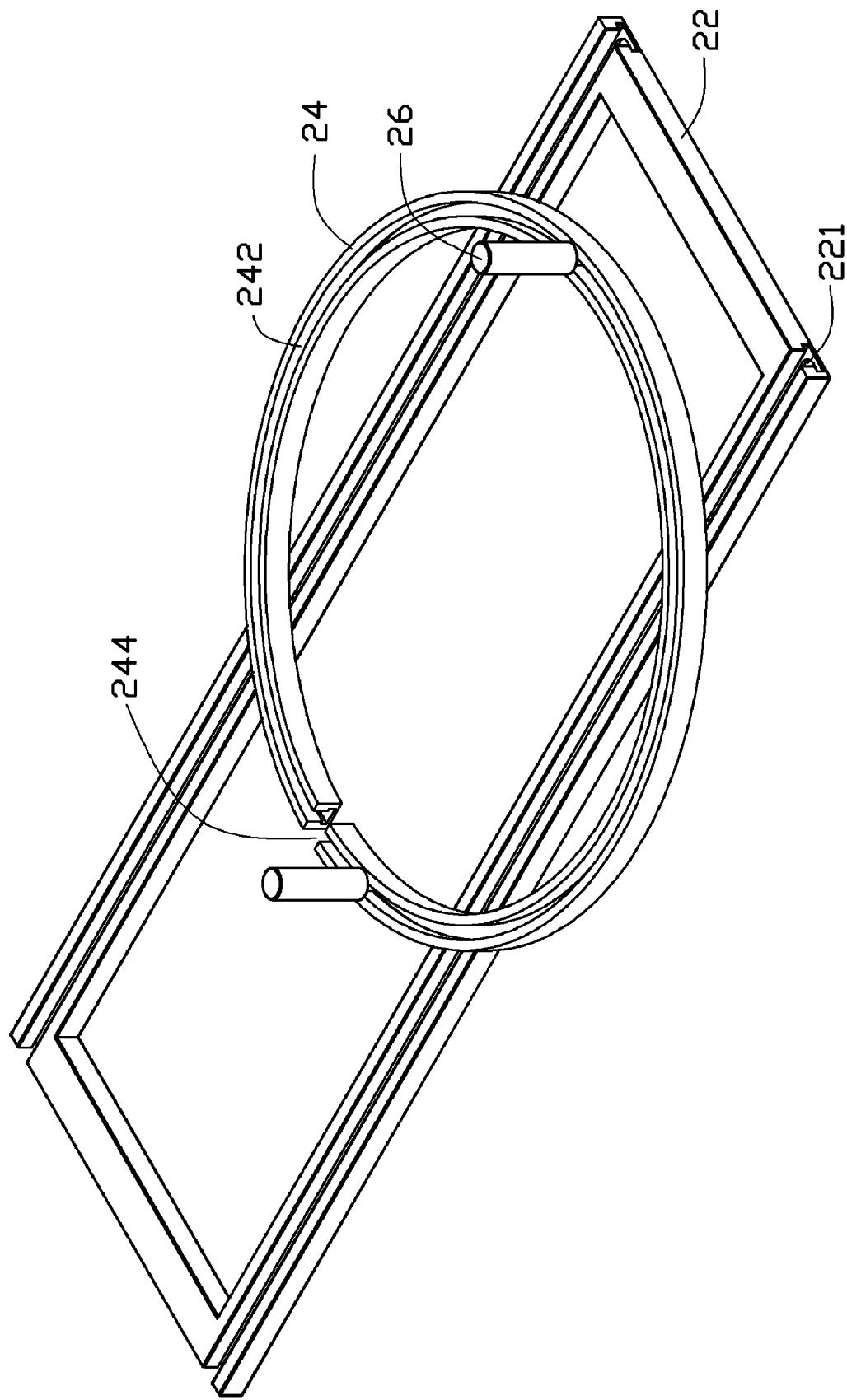
FIG. 4 is an isometric view of the fan apparatus of FIG. 1, with a blower removed.
Figure 5:
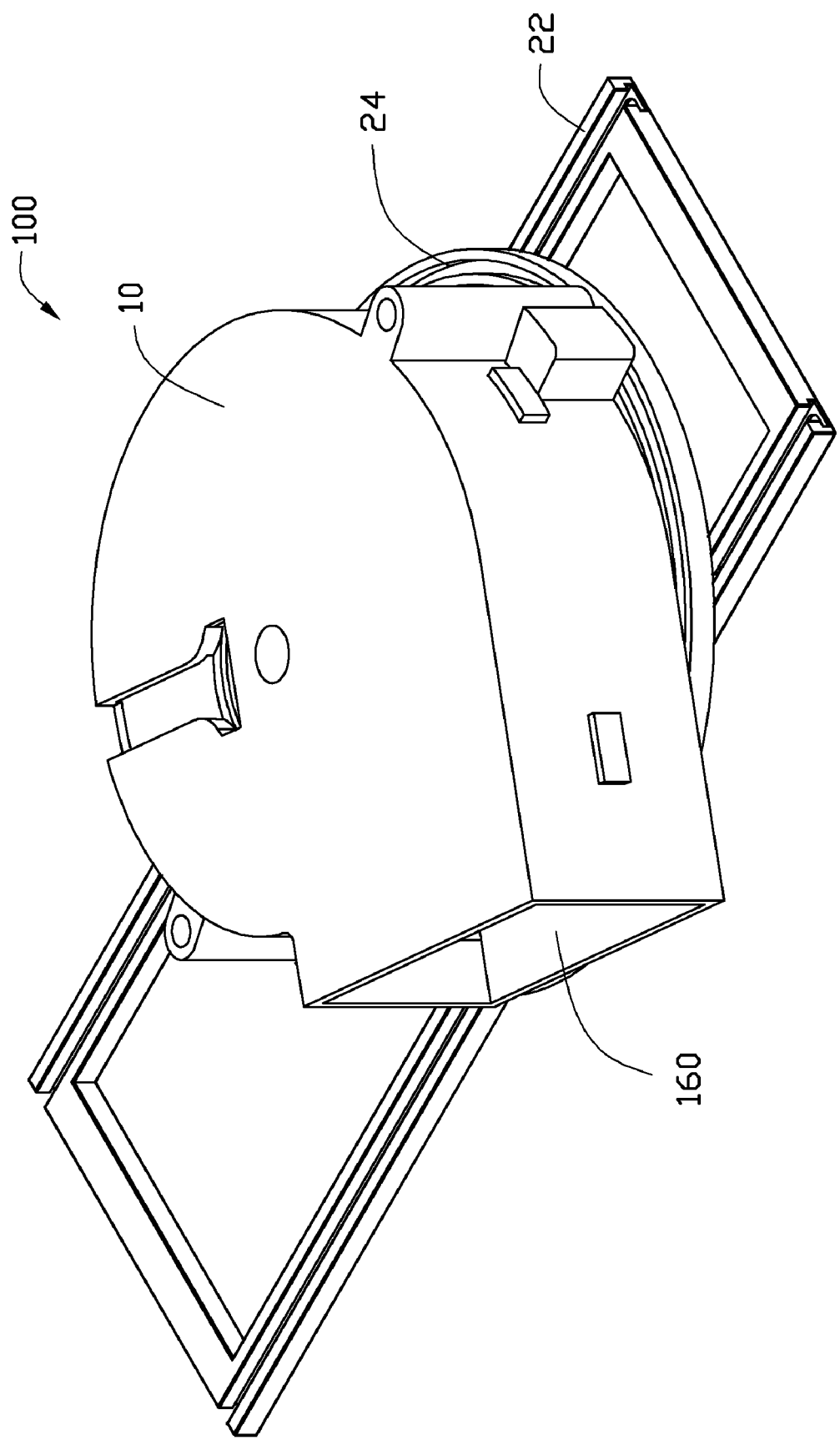
FIG. 5 is similar to FIG. 1, but showing the blower has been rotated by an angle.

Referring to FIGS. 4-5, since the centrifugal blower 10 is connected to the guiding rail 24 by the fasteners 26, which can slide in the annular groove 242 along a circumferential direction of the guiding rail 24, when the fasteners 26 slide in the annular groove 242, the centrifugal blower 10 is rotated along an axis thereof relative to the guiding rail 24. Accordingly, an orientation of the air outlet 160 of the centrifugal blower 10 is changed. Therefore, the orientation of the air outlet 160 of the centrifugal blower 10 can be regulated according to need.

Figure 6:
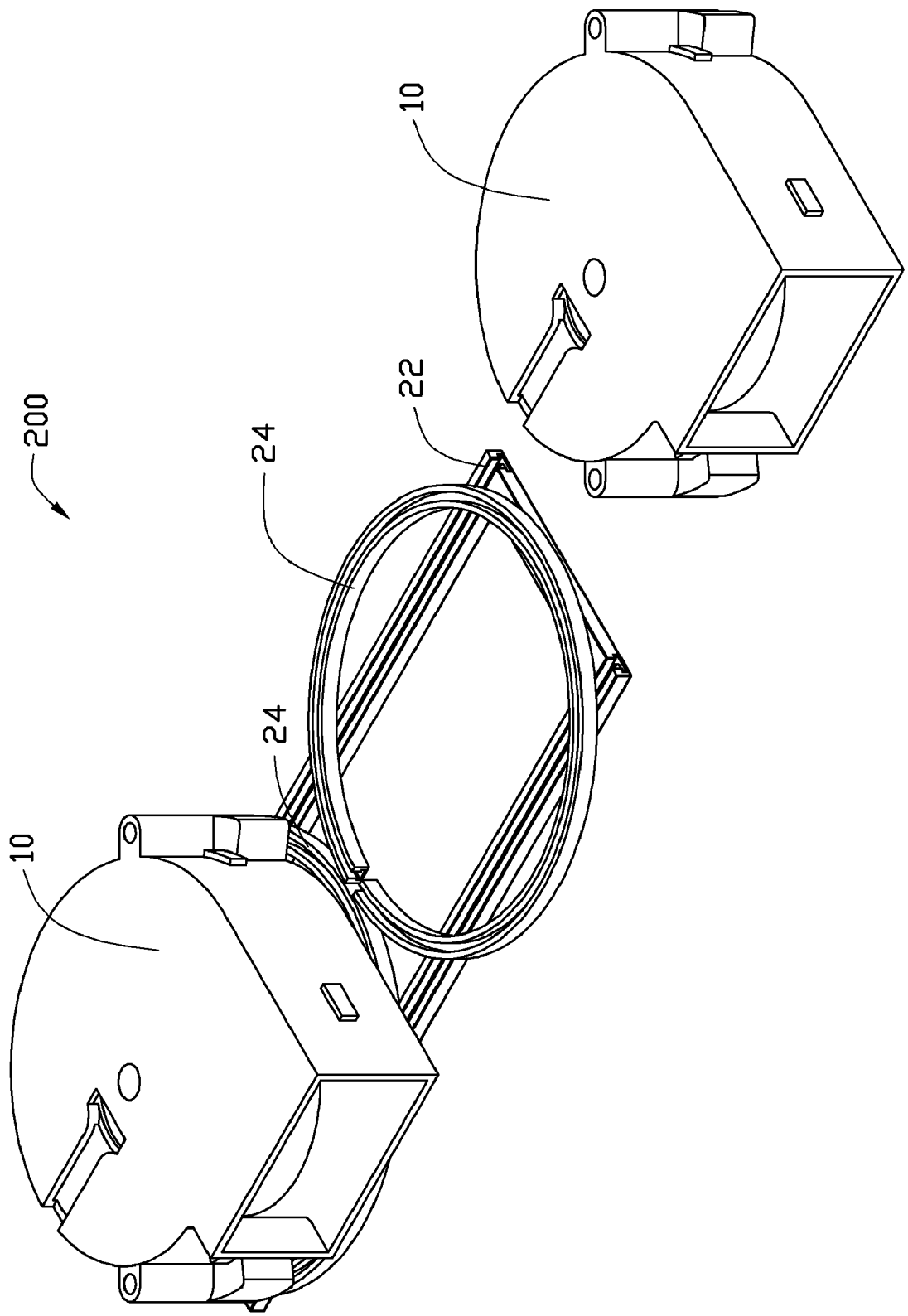
FIG. 6 shows a fan apparatus according to a second embodiment.

As the guiding rail 24 is movably mounted on the mounting frame 22, the location of the air outlet 160 of the centrifugal blower 10 can also be regulated by sliding the fixing members 25 in the elongated groove 221 of the mounting frame 22. Furthermore, two or more guiding rails 24 can be mounted on the mounting frame 22 for expanding the number of the centrifugal blowers 10. FIG. 6 shows a fan apparatus 200 according to a second embodiment of the present disclosure. The fan apparatus 200 differs from the previous fan apparatus 100 in that the fan apparatus 200 includes another centrifugal blower 10 and another guiding rail 24 for mounting another blower 10. The another guiding rail 24 is mounted on the mounting frame 22 and the another centrifugal blower 10 is mounted to the another guiding rail 24.

It is to be understood, however, that even though numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fan apparatus, comprising:
a centrifugal blower defining an air outlet at a lateral side thereof;
a guiding rail defining an annular groove therein;
at least one fastener with one end received in the annular groove of the guiding rail and slidable along the annular groove and another end connected with the centrifugal blower whereby the centrifugal blower is rotatable with respect to the guiding rail when the fastener slides in the annular groove of the guiding rail, the one end of the at least one fastener extending downwardly from the another end of the at least one fastener into the annular groove; and
a mounting frame comprising a pair of ribs and a plurality of fixing members, each of the ribs defining an elongated groove therein, and each of the fixing members comprising a first end extending downwardly from and fixed to a bottom of the guiding rail and an opposite second end extending downwardly away from the first end into a corresponding elongated groove.

2. The fan apparatus of claim 1, wherein at least one securing ear with a securing hole defined therein for connecting the at least one fastener is formed at an outer periphery of the centrifugal blower.

3. The fan apparatus of claim 1, wherein the annular groove has an inverted T-shaped cross section.

4. The fan apparatus of claim 3, wherein each of the at least one fastener comprises a main section connecting with the centrifugal blower, a fixing section received in the annular groove of the guiding rail and a thin section located between the main section and the fixing section, a diameter of the thin section being smaller than that of the fixing section.

5. The fan apparatus of claim 3, wherein the guiding rail has an annular profile with an entrance defined at an end thereof, the first end of the at least one fastener entering into the annular groove of the guiding rail via the entrance.

6. The fan apparatus of claim 1, wherein the elongated groove has an inverted T-shaped cross section.

7. The fan apparatus of claim 6, wherein each of the fixing members further comprises a main portion and a head portion, the main portion comprising the second end, and the head portion connected with the main portion and comprising the first end, wherein a diameter of the head portion is greater than that of the main portion.

8. The fan apparatus of claim 7, wherein the elongated groove extends from one end of the rib to the other end of the rib, and is open at one end of the rib.

9. The fan apparatus of claim 1, further comprising another guiding rail movably mounted on the mounting frame and another centrifugal blower rotatably connected with the another guiding rail.

* * * * *